F. E. CRYDER.
MILK STERILIZING APPARATUS.
APPLICATION FILED OCT. 3, 1918.
1,328,722.
Patented Jan. 20, 1920.
3 SHEETS—SHEET 1.
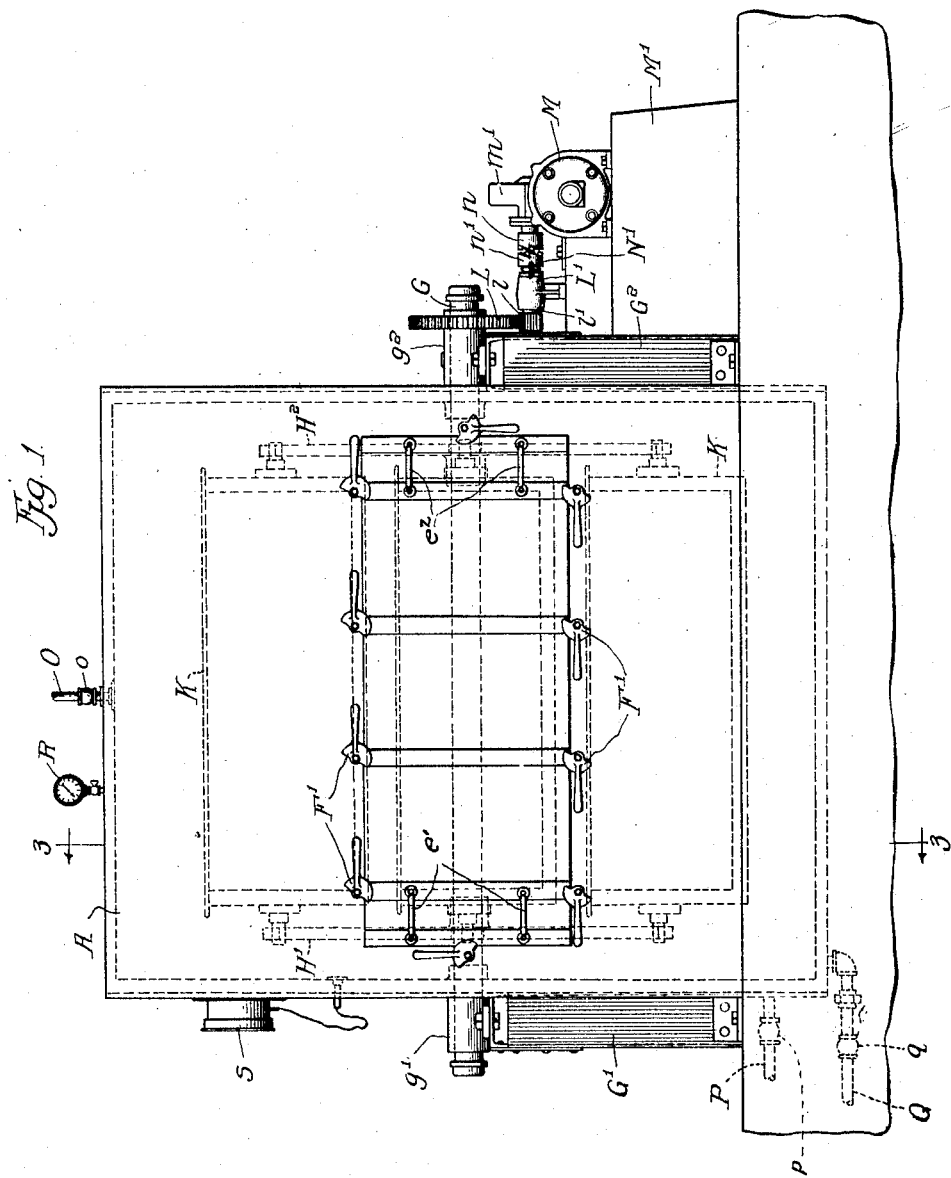
Witnesses:
Fred C. Davison
R. Burkhardt
Inventor:
Floyd E. Cryder
By Wilkinson & Huxley
Attys F. E. CRYDER.
MILK STERILIZING APPARATUS.
APPLICATION FILED OCT. 3, 1918.
1,328,722.
Patented Jan. 20, 1920.
3 SHEETS—SHEET 2.
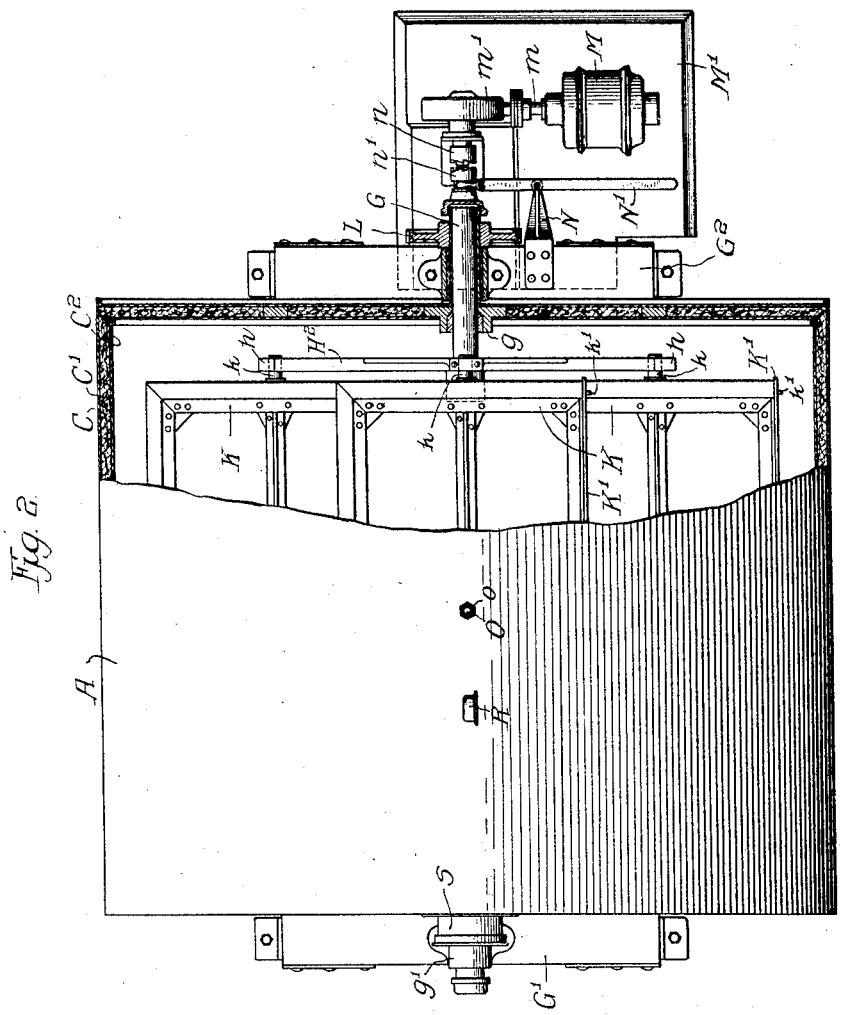
Witnesses:
Inventor.
Floyd E. Cryder
By Wilkinson & Huxley
Attys.

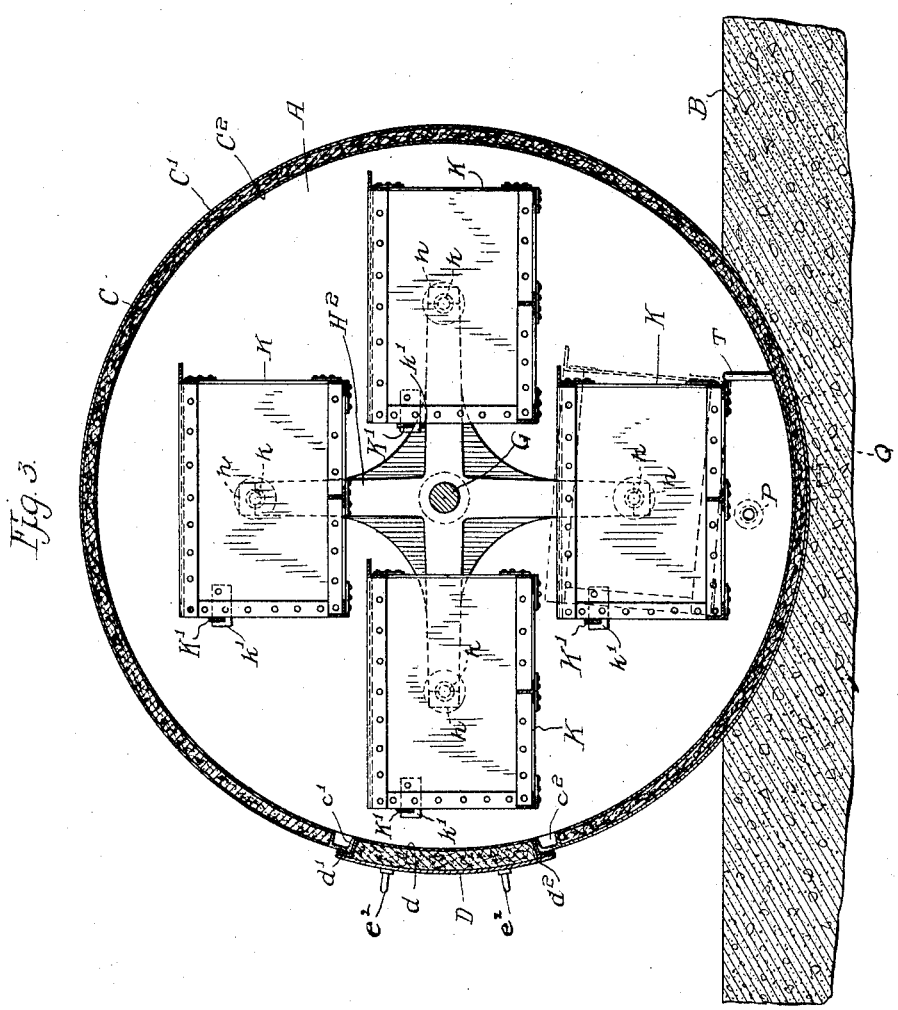

UNITED STATES PATENT OFFICE.

FLOYD E. CRYDER, OF CHICAGO, ILLINOIS.

MILK-STERILIZING APPARATUS.

1,328,722. Specification of Letters Patent. Patented Jan. 20, 1920.

Application filed October 2, 1918. Serial No. 256,722.

*To all whom it may concern:*

Be it known that I, FLOYD E. CRYDER, a citizen of the United States, residing at Chicago, in the county of Cook and State of Illinois, have invented certain new and useful Improvements in Milk-Sterilizing Apparatus, of which the following is a specification.

My invention relates, in general, to sterilizing milk, and more particularly to an improved apparatus for uniformly subjecting the milk under treatment to substantially constant predetermined heat.

In sterilizing milk it is desirable that all portions thereof should be exposed to the heating medium and that the predetermined degree of heat should be maintained during the sterilizing process in order that all pathogenic bacteria which should be eliminated may be destroyed without impairing the essential food values of the milk.

One of the objects of my invention is to provide a sterilizing apparatus in which the milk will be sufficiently agitated to uniformly expose all portions thereof to the heat, so that some portions will not be overheated or too long subjected to the maximum temperature, while other portions are insufficiently subjected to the heat.

Another object of my invention is to provide a milk sterilizing apparatus which will be insulated from the surrounding atmosphere, so that the desired critical temperature may be maintained regardless of the atmospheric temperature.

A further object of my invention is to provide an apparatus for sterilizing milk, and also for cooling the milk after it has been sterilized.

A still further object of my invention is to provide a milk sterilizing apparatus which will be comparatively simple in construction, convenient in use, and efficient in operation.

My invention will be more fully disclosed hereinafter with reference to the accompanying drawings, in which the same is illustrated as embodied in a convenient and practical form, and in which—

Figure 1 is a side elevational view;

Fig. 2 is a plan view, a portion of the casing being broken away; and,

Fig. 3 is a vertical sectional view on line 3—3 of Fig. 1.

The same reference characters are used to designate the same parts in the several figures of the drawings.

A designates a casing which is preferably cylindrical in form and is securely supported upon a suitable foundation B, preferably made of cement, in which the lower portion of the casing is embedded.

The casing A is provided with heat insulating means to prevent the temperature within the casing from being affected by the atmospheric temperature. The cylindrical wall of the casing may be conveniently formed of two concentric sheet metal shells $C^1$, $C^2$, between which is located the heat insulating material C. The circular end walls of the casing are similarly formed of two parallel heads, between which is located the insulating material. In order to permit access to the interior of the casing, a door opening is provided through one side of the cylindrical wall, in which is placed a door frame preferably formed of channel beams $c^1$, $c^2$. D indicates a door of a size to fit within the door opening, which is preferably of the same curvature as the cylindrical wall of the casing and comprises marginal angle bars $d^1$, $d^2$ which overlie the channel beams forming the frame around the door opening. The door D is provided with insulating material retained upon the inner surface of the door by a plate $d$. Handles $e^1$, $e^2$ are secured to the door to facilitate the bodily movement thereof into and out of closing position with respect to the door opening. The door is tightly secured in closed position by any suitable means, such, for instance, as cam latches F' supported upon the shell around the door opening and adapted to be oscillated into and out of position to overlie the periphery of the door.

Extending longitudinally through the casing A, and preferably concentric relatively thereto, is a shaft G, which is suitably journaled and packed as indicated at $g$, where it passes through the end walls of the casing. Rigidly secured to the shaft G adjacent the inner surfaces of the heads of the casing, are spiders $H^1$, $H^2$, comprising radially alined arms. Pivotally supported between each alined pair of arms on the spiders is a cradle K, preferably made of strips of sheet metal. The end walls of each cradle K are provided with trunnions $k$, which are journaled in bearings in the outer ends of the alined pairs of arms of the spiders. The trunnions are preferably located above the center of gravity of each cradle, so that it will be supported in the same position with one side always presented upwardly during its rotation within the casing. In order to permit the convenient insertion and removal of the materials to be treated into and out of the cradle, a removable bar K¹ is removably supported in a position to close one side of the cradle by means of hooks $k^1$.

The ends of the shaft G, which project beyond the end walls of the casing, are journaled upon bearings $g^1$, $g^2$, which are supported by suitable standards $G^1$, $G^2$ secured upon the foundation B. One end of the shaft G has fixed thereto a gear wheel L, which meshes with a pinion $l$, the latter being fixed upon a shaft $l^1$ journaled in a bearing $L^1$. M designates a motor for rotating the shaft G through suitable connections with the pinion $l$. Such connections comprise a motor shaft $m$, which, through a gearing $m^1$, rotates a clutch member $n$. The coöperating clutch member $n^1$ is splined upon the shaft $l^1$, and is movable into and out of engagement with the clutch member $n$ by any suitable means, such, for instance, as a lever $N^1$ fulcrumed on a bracket N.

O designates a conduit communicating with the interior of the casing A for supplying a heating medium, such as steam, thereto. The supply of the heating medium is controlled by a valve $o$. P designates a conduit for supplying cold water to the interior of the casing A, a valve $p$ being provided for controlling the flow of the water through said conduit. Q indicates a discharge conduit leading from the bottom of the casing A the passage through which is controlled by a valve $q$.

R designates a pressure gage mounted upon the casing and communicating with the interior thereof to indicate the pressure within the casing. S designates a recording thermometer for recording the temperature within the casing.

T designates a projection fixed within the casing A and projecting into the path of movement of the cradles K, so that as they are rotated by the shaft G they will be oscillated through their engagement with the said projection.

The manners of using and operation of my improved apparatus are as follows: The door D is removed and each cradle in turn is brought into registry with the door opening, so that bottles of milk may be readily placed in or removed from the cradles. After the cradles have been successively filled with the bottles of milk to be treated, a predetermined quantity of cold water is supplied through the conduit $p$ to the interior of the casing, preferably an amount sufficient to extend into the path of movement of the cradles. Steam is then admitted to the interior of the casing through the conduit O until a predetermined temperature and pressure is attained. The clutch members are engaged so that the motor rotates the shaft G and with it the spiders fixed thereon and the cradles pivotally carried between the spiders. As each cradle passes the projection T it is oscillated, thereby agitating the milk carried within the cradle, so that all portions thereof are exposed to the surrounding heating medium. When bottles of milk are carried by the cradles the oscillation of them during their rotation causes the milk to be stirred within the bottles so that all portions thereof are uniformly subjected to the heat.

By insulating the casing the temperature in the interior thereof is not affected by the atmospheric temperature and consequently the exact temperature desired for sterilizing is maintained in the casing unaffected by the radiation of atmospheric heat to or from the interior of the casing and the atmosphere.

After the sterilizing process has been completed, the steam conduit is closed and cold water is admitted into the casing so that the rotation of the cradles will carry the milk through the cold water and thereby properly cool the sterilized milk.

After the cooling step has been completed the door D of the casing is removed and the cradles are successively brought opposite the door opening so that the sterilized milk may be removed and replaced by a new charge of milk to be sterilized.

From the foregoing description it will be observed that I have invented an improved sterilizing apparatus in which milk or cream may be efficiently treated so as to destroy the undesirable bacteria without injuring the food properties of the processed milk, inasmuch as the desired temperature is maintained unaffected by the changes in atmospheric temperature, and inasmuch as the milk during treatment is agitated so that all portions thereof are uniformly exposed to heat. It will be observed further that by the use of my improved apparatus milk is not only efficiently sterilized, but is also properly cooled after being sterilized.

What I claim is:

1. In a milk sterilizing apparatus, the combination with a casing, of means for heating the interior of the casing, cradles within said casing for containing the milk to be treated, means for revolubly supporting the cradles, and means for oscillating said cradles during their revolution.

2. In a milk sterilizing apparatus, the combination with a casing, of means for heating the interior of the casing, cradles within said casing for containing the milk to be treated, means for revolubly supporting said cradles while maintaining them in substantially upright position throughout the travel thereof, and means for oscillating said cradles during their revolution.

3. In a milk sterilizing apparatus, for combination with a casing, of means for heating the interior of the casing, cradles within said casing for containing the milk to be treated, means for revolubly supporting said cradles, and a projection extending into the path of the cradles for oscillating the same successively during a part of their revolution.

4. In a milk sterilizing apparatus, the combination with a casing, of means for supplying a heating medium to the interior of the casing, a shaft within the casing, means for rotating said shaft, spiders carried by said shaft, cradles for containing the milk to be treated pivotally supported by said spiders, and a projection extending into the path of the cradles for oscillating the same successively during a part of their revolution.

5. In a milk sterilizing apparatus, the combination with a stationary cylindrical casing, of a shaft concentrically extending through said casing, means for rotating said shaft, radially projecting arms secured to said shaft, cradles for containing the milk to be treated pivotally supported between alined pairs of arms and maintained by gravity in substantially upright position, and means for individually oscillating said cradles during their revolution within the casing.

6. In a milk sterilizing apparatus, the combination with a stationary cylindrical casing, of heat insulating means surrounding said casing, a removable door forming part of one side of the cylindrical wall of said casing, said door comprising heat insulating material, a shaft extending longitudinally through said casing, alined pairs of radial arms fixed to said shaft, cradles pivotally supported between the arms in the alined pairs and maintaining the same in substantially horizontal position, means for rotating said shaft, and means for oscillating the cradles during their rotation with said shaft.

7. In a milk sterilizing apparatus, the combination with a casing, of means for heating the interior of the casing, means for cooling the interior of the casing, cradles within said casing for containing the milk to be treated, means for revolubly supporting the cradles, and means for oscillating said cradles during their revolution.

Signed at Chicago, Illinois, this 28th day of September, 1918.

FLOYD E. CRYDER.